(12) United States Patent
Kurosawa et al.

(10) Patent No.: US 8,738,277 B1
(45) Date of Patent: May 27, 2014

(54) GAS STATION RECOMMENDATION SYSTEMS AND METHODS

(71) Applicant: Honda Motor Co., Ltd., Tokyo (JP)

(72) Inventors: Fuminobu Kurosawa, San Jose, CA (US); Xin Guan, Milpitas, CA (US); Shalini Saxena, Fremont, CA (US); Roopnath Grandhi, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/803,961

(22) Filed: Mar. 14, 2013

(51) Int. Cl.
*G06F 7/00* (2006.01)
*G01C 21/00* (2006.01)
*G01C 21/36* (2006.01)

(52) U.S. Cl.
USPC .......................................... 701/123; 701/424

(58) Field of Classification Search
USPC ......................................................... 701/424
See application file for complete search history.

(56) References Cited

U.S. PATENT DOCUMENTS

| | | | |
|---|---|---|---|
| 6,175,803 B1 | 1/2001 | Chowanic et al. | |
| 6,498,982 B2 | 12/2002 | Bellesfield et al. | |
| 6,542,812 B1 | 4/2003 | Obradovich et al. | |
| 6,600,994 B1 | 7/2003 | Polidi | |
| 6,680,675 B1 | 1/2004 | Suzuki | |
| 6,829,532 B2 | 12/2004 | Obradovich et al. | |
| 6,993,429 B2 | 1/2006 | Obradovich et al. | |
| 7,092,818 B2 | 8/2006 | Ohler | |
| 7,155,339 B2 | 12/2006 | Tu | |
| 7,233,861 B2 | 6/2007 | Van Buer et al. | |
| 7,302,338 B2 | 11/2007 | Petzold et al. | |
| 7,353,109 B2 | 4/2008 | Han | |
| 7,522,992 B2 | 4/2009 | Obradovich et al. | |
| 7,593,812 B2 | 9/2009 | Obradovich et al. | |
| 7,761,350 B1 | 7/2010 | Ridgeway | |
| 7,831,384 B2 | 11/2010 | Bill | |
| 7,835,859 B2 | 11/2010 | Bill | |
| 7,991,544 B2 | 8/2011 | Singh | |
| 8,121,931 B2 * | 2/2012 | Kirch et al. | 705/37 |
| 8,175,802 B2 | 5/2012 | Forstall et al. | |
| 8,232,898 B2 * | 7/2012 | Bai et al. | 340/991 |
| 2006/0058955 A1 | 3/2006 | Mehren | |

(Continued)

FOREIGN PATENT DOCUMENTS

KR 1020100001006 * 1/2010 ............. G06Q 50/00

OTHER PUBLICATIONS

Newcomb, Doug; Hands-On With HondaLink in the 2013 Accord; dated Sep. 10, 2012; retrieved from http://www.wired.com/autopia/2012/09/2013-honda-accord-hondalink/; 5 pages.

*Primary Examiner* — John R Olszewski
*Assistant Examiner* — Navid Ziaeianmehdizadeh
(74) *Attorney, Agent, or Firm* — Ulmer & Berne LLP (57) ABSTRACT

A method for determining a preferred gas station comprises determining gas stations in range of a vehicle, receiving one or more factors associated with refueling preferences for a profile associated with the vehicle, the factor being derived at least in part from data associated with previous refueling of the vehicle, comparing the factor with information associated with the gas stations to determine the preferred gas station. A system comprises a receiver configured to enable communications with a remote server and receive a factor associated with refueling preferences, and a processor configured to determine gas stations in range of a vehicle, and compare the factor with information about the gas stations to determine a preferred gas station.

20 Claims, 6 Drawing Sheets

(56) References Cited

U.S. PATENT DOCUMENTS

| | | | |
|---|---|---|---|
| 2006/0129313 A1* | 6/2006 | Becker et al. | 701/202 |
| 2008/0208469 A1* | 8/2008 | Obradovich et al. | 701/213 |
| 2010/0036599 A1 | 2/2010 | Froeberg et al. | |
| 2011/0238289 A1 | 9/2011 | Lehmann et al. | |
| 2011/0251754 A1* | 10/2011 | Jones | 701/35 |
| 2011/0301806 A1* | 12/2011 | Messier et al. | 701/33 |
| 2012/0072109 A1* | 3/2012 | Waite et al. | 701/431 |
| 2012/0116670 A1* | 5/2012 | Rosekrans | 701/426 |
| 2012/0116673 A1* | 5/2012 | Lee et al. | 701/432 |
| 2012/0179359 A1* | 7/2012 | Profitt-Brown et al. | 701/123 |
| 2013/0035847 A1* | 2/2013 | Yamakawa et al. | 701/409 |
| 2013/0124347 A1* | 5/2013 | Hwang | 705/16 |
| 2013/0226443 A1* | 8/2013 | Scofield et al. | 701/123 |

* cited by examiner

| USER | PROFILE | FACTORS |
|---|---|---|
| USER 1 | THRIFTY, LAID BACK LIFESTYLE<br><br>NOT SENSITIVE TO BRAND<br><br>THIRD PARTY RATING DOES NOT IMPACT DECISIONS | NOT TIME SENSITIVE<br><br>PRICE SENSITIVE<br><br>NOT BRAND SENSITIVE<br><br>THIRD PARTY RATE: 2.5 |
| USER 2 | BUSY, STRONGLY VALUES TIME<br><br>PREFERS BRAND X<br><br>THIRD PARTY RATINGS IMPACT DECISIONS | TIME SENSITIVE<br><br>NOT PRICE SENSITIVE<br><br>BRAND SENSITIVE<br><br>THIRD PARTY RATE: 5 |
| USER 3 | HIGH MILEAGE COMMUTER<br><br>USES BRAND X ALMOST EXCLUSIVELY<br><br>THIRD PARTY RATING DOES NOT IMPACT DECISIONS | TIME SENSITIVE<br><br>PRICE SENSITIVE<br><br>BRAND SENSITIVE<br><br>THIRD PARTY RATE: 2 |

GAS STATION RECOMMENDATION SYSTEMS AND METHODS

TECHNICAL FIELD

The systems and methods described below relate generally to the field of navigation systems, and, more specifically, to gas station recommendation systems and methods.

BACKGROUND

Users of conventional navigation systems can use global position systems (GPS) and associated devices to obtain directions to nearby gas stations. The position of the user, as determined by a GPS device, can be used to determine a list of gas stations. The list of gas stations can be ordered based on proximity to the user. The user can select a gas station from the list and the GPS device can provide directions to the selected gas station.

SUMMARY

In accordance with one embodiment, a computer-implemented method is provided that comprises determining a plurality of gas stations in range of a vehicle, receiving a factor associated with refueling preferences for a profile associated with the vehicle, the factor being derived at least in part from data associated with previous refueling of the vehicle, comparing the factor with information associated with the gas stations, and determining a preferred gas station based at least in part on the result of the operation of comparing.

In accordance with another embodiment, a mobile computing device comprises a receiver configured to enable communications with a remote server and further configured to receive a factor associated with a refueling preference from the remote server, the factor being derived at least in part from data associated with previous refueling of the vehicle, and a processor configured to determine gas stations in range of a vehicle, compare the factor with information associated with the gas stations, and determine a preferred gas station based at least in part on the result of the compare operation.

In accordance with yet another embodiment, a method comprises determining, by a mobile computing device, a plurality of factors associated with preferences related to refueling a vehicle at a gas station, determining, also by the mobile device, a preferred gas station from a plurality of gas stations proximate to at least one of the current position of the vehicle and a projected route of the vehicle, and wherein the preferred gas station is based at least in part on a comparison of at least one of the plurality of factors with information associated with each of the plurality of gas stations.

BRIEF DESCRIPTION OF THE DRAWINGS

Various embodiments will become better understood with regard to the following description, appended claims, and accompanying drawings wherein:

DETAILED DESCRIPTION

Various non-limiting embodiments of the present disclosure will now be described to provide an overall understanding of the principles of the structure, function, and use of systems and methods disclosed herein for providing gas station recommendations based on user profile factors. One or more examples of these non-limiting embodiments are illustrated in the selected examples disclosed and described in detail with reference made to FIGS. 1-6 in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

The systems, apparatuses, devices, and methods disclosed herein are described in detail by way of examples and with reference to the figures. The examples discussed herein are examples only and are provided to assist in the explanation of the apparatuses, devices, systems and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures or characteristics may be combined in any suitable manner in one or more embodiments.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context. It should be noted that although for clarity and to aid in understanding some examples discussed herein might describe specific features or functions as part of a specific component or module, or as occurring at a specific layer of a computing device (for example, a hardware layer, operating system layer, or application layer), those features or functions may be implemented as part of a different component or module or operated at a different layer of a communication protocol stack. Those of ordinary skill in the art will recognize that the systems, apparatuses, devices, and methods described herein can be applied to, or easily modified for use with, other types of equipment, can use other arrangements of computing systems such as client-server distributed systems, and can use other protocols, or operate at other layers in communication protocol stacks, than are described.

Graphical user interfaces can be used to present information to a user in the form of icons, graphics, or other types of interactive elements. Such interactive elements are generally associated with a particular action or command. A user typically has to supply an input to a computing system that is associated with the interactive elements presented on the graphical user interface to execute the particular action or command. As used herein, "interactive element" is to broadly include a wide variety of graphical tools or components, such as graphical icons, graphical menus, graphical buttons, hyperlinks, images, and any other element which can be displayed on a graphical display and associated with or otherwise linked to an action or process that is to be performed upon activation of an interactive element.

Figure 1:
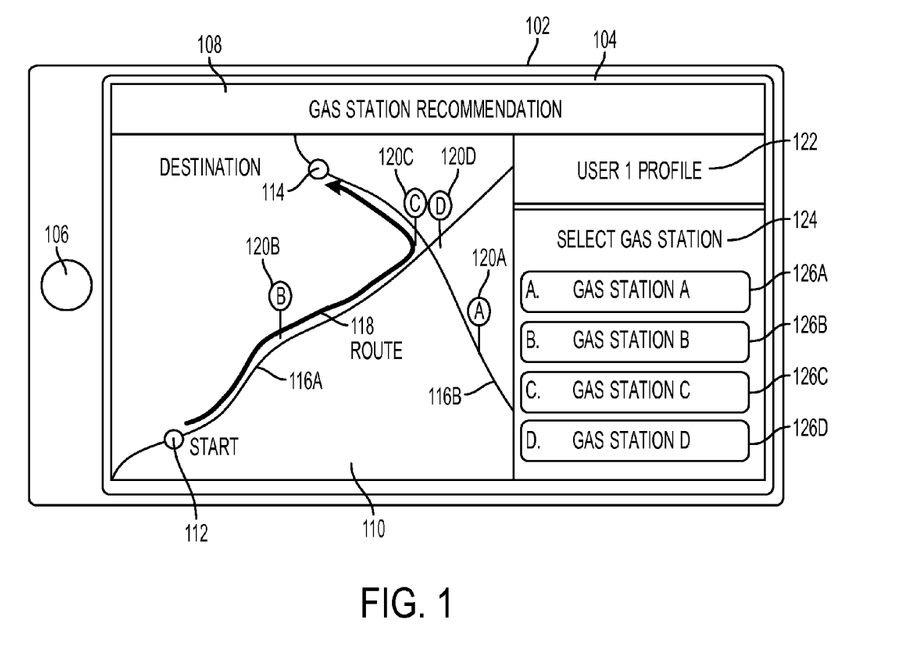
FIG. 1 depicts a display providing gas station recommendations.

Referring now to FIG. 1, example elements of a mobile computing device 102 for providing a gas station recommendation are presented. The mobile computing device 102 can include a touch sensitive screen 104 for accepting user interactions with any interactive elements that are displayed on the touch sensitive screen 104. The mobile computing device 102 can optionally include a home button 106, such as a physical button that returns the user to a home screen. In an embodiment, the home button can be an interactive element. An application 108 for displaying a gas station recommendation can execute on the mobile computing device 102. In a configuration, the application 108, or app, can execute on a smart phone or an internet-enabled tablet that operates as the mobile computing device 102. For example, the application 108 can be an app that is made available to users from the Apple™ iStore™, or another app store, for downloading onto and executing on an Apple™ iPhone™ or iPad™. In other configurations, the application 108 can be executed by a processor associated with a vehicle computing system that is operating as the mobile computing device 102.

The application 108 can include a map 110 that displays a position labeled start 112, a position on the map labeled destination 114, nearby roads 116A, 116B (collectively roads 116), and the projected route 118 of the vehicle. Based on a user profile 122, and associated user profile factors described herein, and as described in greater detail below, the application 108 can provide one or more preferred gas stations 120A, 120B, 120C, 120D (collectively 120). The preferred gas stations 120 can be displayed, for example, using the flags illustrated in the circled letters A, B, C, and D as shown in FIG. 1. The preferred gas stations 120 can be interactive elements, allowing a user to select one of the preferred gas stations 120 by touching the touch sensitive screen 104 at the circled letters A, B, C, and D. The application 108 can also include interactive elements such as the selectable interactive elements 126A, 126B, 126C, and 126D (collectively 126). The selectable interactive elements can be presented in any suitable form, for example as a list as shown. An instruction 124 can instruct the user to select a particular selectable interactive element 126 to select one of the preferred gas stations 120.

If the user selects a preferred gas station 120, the route 118 can be updated, for example by adding an intermediate point that includes the preferred gas station 120 in the route 118, or by changing the destination 114 as appropriate. Other operations and interactive elements as would be understood in the art can be included in the application 108.

Figure 2:
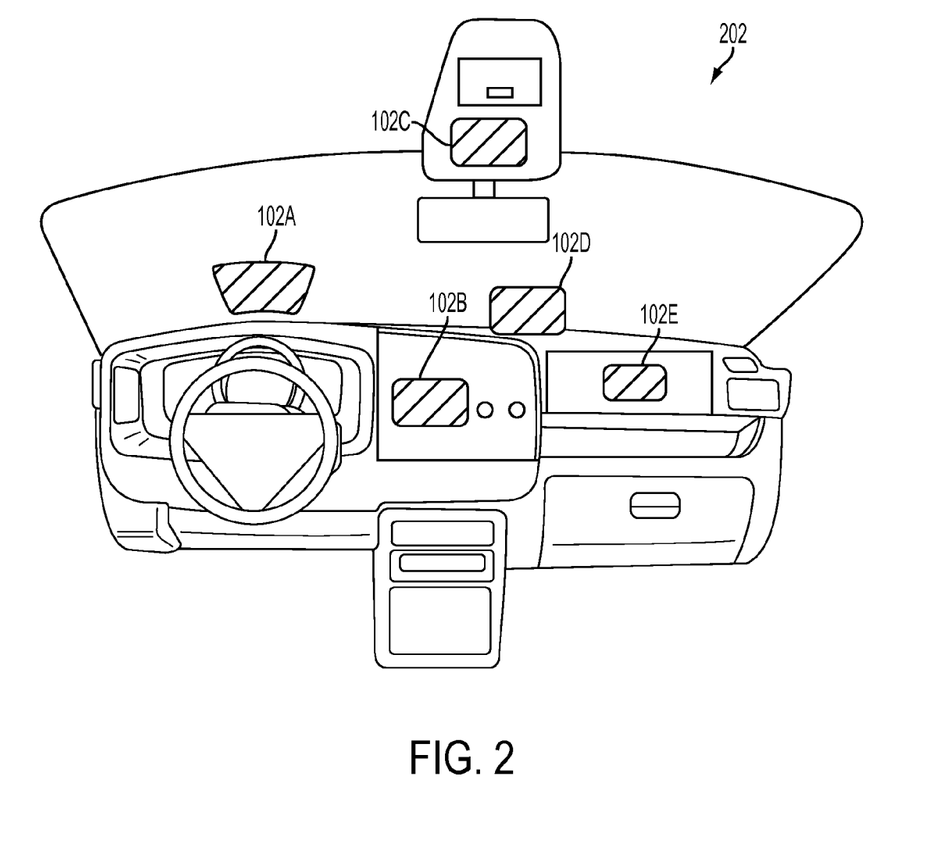
FIG. 2 depicts example displays in a vehicle.

Referring now to FIG. 2, example configurations and placements of the mobile computing device 102 in the cabin 202 of the vehicle are presented. The mobile computing device 102 can be a handheld mobile computing device 102E such as a smart phone, a tablet, or another suitable computing device. The mobile computing device 102 can be associated with a vehicle structure. For example, a mobile computing device 102B can be integrated into the dashboard or use a display that is integrated into the dashboard. In another example, a mobile computing device 102C can be integrated into an overhead console or use a display that is integrated into the overhead console. A mobile computing device 102D can be separate from the vehicle structure but mounted to or placed on the dashboard of the vehicle. A mobile computing device 102A can also use heads up display technology.

Many vehicles utilize one or more graphical displays to display information to the vehicle's occupants, and in some cases, receive inputs from those occupants. Such graphical displays can be positioned in numerous places throughout the vehicle compartment. For example, some vehicles utilize a graphical display in the instrument cluster to provide vehicle information, such as a speed, mileage, oil life, and so forth. Some vehicles use a graphical display to present navigational information to the vehicle occupants. Some vehicles use a graphical display to present climate control information. Some vehicles use a graphical display to present entertainment options and information. Some vehicles use a graphical display to present information to vehicle occupants, such as information received from a smart phone or another computing device (such as mobile computing device 102) that is in communication with the vehicle, such as through a universal serial bus (USB) or Bluetooth™ connection. In various configurations, the functionality of the mobile computing device 102 can be incorporated into existing equipment or other devices present in the cabin 202 of the vehicle, or integrated with vehicle subsystems, including but not limited to navigational systems, cruise control, and other automated guidance modules, entertainment systems such as radio, digital audio players, and digital video players, cellular or satellite phone systems, climate control systems, and so forth.

Figure 3:
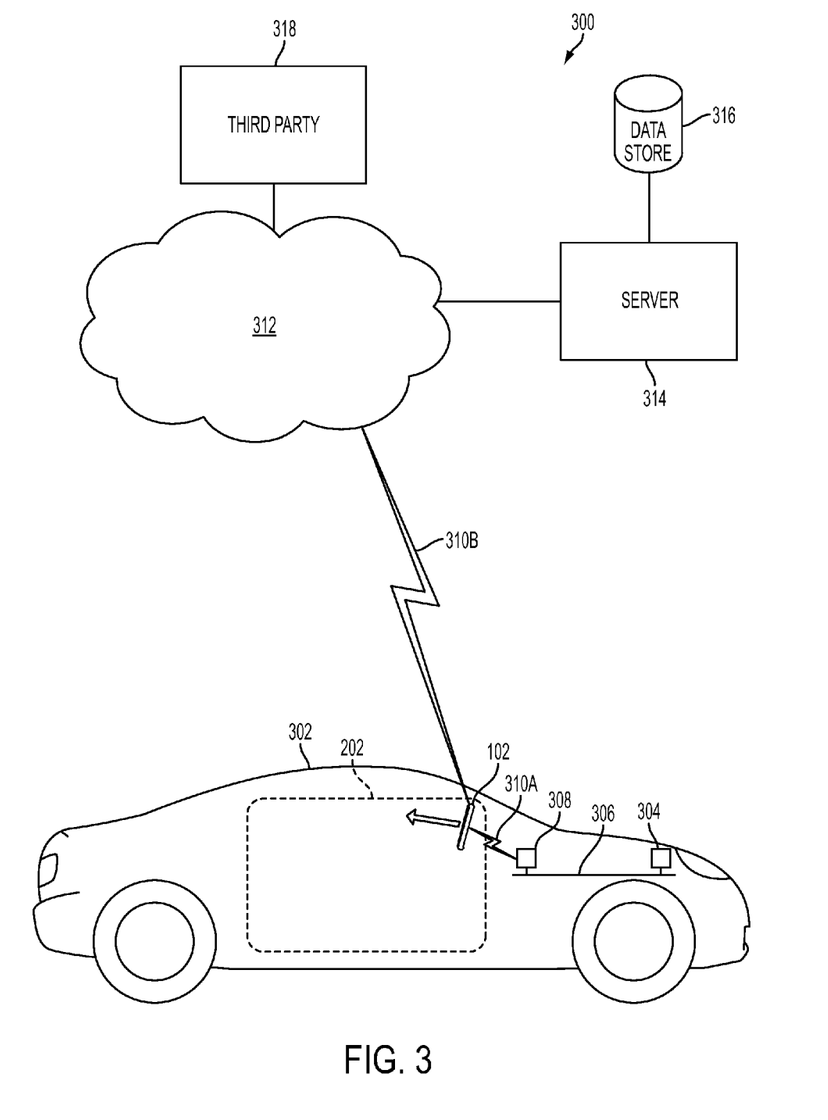
FIG. 3 depicts a system for providing gas station recommendations based on user profile factors.

Referring now to FIG. 3, a system 300 for providing gas station recommendations based on user profile factors is presented. The system 300 can include a mobile computing device 102 in the cabin 202 of a vehicle 302 and one or more servers 314 and data stores 316 external to the vehicle 302 and mobile computing device 102. The system 300 can use networks 312 such as the Internet and cellular networks to transmit and receive data. The system 300 can transmit and receive data with third parties 318.

In a configuration, the vehicle 302 include vehicle electronics 304 configured to transmit and receive vehicle data collected from vehicle sensors using a vehicle network 306. An example vehicle network 306 is a vehicle controller area network (CAN). Example vehicle data is CAN data. The vehicle data can include speed, position, fuel level, blinker activation, and other sensor data. The vehicle electronics 304 can include a global positioning system (GPS) receiver. A transceiver 308 can be connected to the vehicle network 306 to enable communications with other devices. The transceiver 308 can use one or more wireless technologies including but not limited to WiFi™, Bluetooth™, ZigBee™, one of the IEEE 802.11x family of network protocols, a cellular protocol, or another suitable wireless network protocol, or wired technologies, such as the Universal Serial Bus (USB) protocol. In the illustrated configuration, transceiver 308 is shown as a wireless transceiver.

In an embodiment, the mobile computing device 102 can establish a wireless communication link 310A with the vehicle network 306 and receive vehicle data such as CAN data. The vehicle data can be updated periodically, such as once every second, or can be retrieved asynchronously as needed. The vehicle data can include position, speed, and fuel level. In a configuration, the mobile computing device 102 can have GPS receiver. In a configuration, the mobile computing device 102 can receive position information from another system. In a configuration, the mobile computing device can determine position using triangulation techniques, for example using cellular signal triangulation or WiFi signal triangulation. In a configuration, the mobile computing device 102 can be a mobile computing device, such as a smart phone, tablet computer, or any other suitable type of computing device having network connectivity. The mobile computing device 102 can use a network 312, for example a third or fourth generation cellular network (3G/4G) or a WiFi network, to transmit and receive data with one or more servers 314, including but not limited to servers of third parties 318. For example, the mobile computing device 102 can receive the vehicle data from the wireless receiver 308 of the vehicle network 306 across the wireless communication link 310A and periodically send the vehicle data to a server 314 using a second wireless communication link 310B. The vehicle data can be sent periodically, such as once every minute, or can be sent more or less frequently. In some configurations, an app executing on the mobile computing device 102 generally facilitates the sending of the vehicle data to the server 314. In various configurations, some or all of the operations and functions of the mobile computing device 102 can be performed by the vehicle electronics 304, a GPS device, or the remote server 314.

The mobile computing device 102 can use the second wireless communication link 310B, or another communication link, to transmit and receive data with a server 314 that is associated with user profiles and user profile factors. In an example operation, the mobile computing device 102 can allow a user to manually enter a name associated with their user profile, for example by typing characters on interactive elements associated with particular keys displayed on the touch sensitive screen, or by selecting a user profile from a list of recent users of the mobile computing device 102. The user profile can also be automatically determined. For example, if the mobile computing device 102 is a smart phone associated with a particular user, then the mobile computing device 102 transmit the user profile associated with that particular user. In another example, if a driver uses a key or wireless keyfob to unlock a door or start the vehicle 302, vehicle electronics 304 in communication with the mobile computing device 102 can transmit the driver's identity to the mobile computing device 102 including the user profile.

Once the mobile computing device 102 has identified the user, the mobile computing device 102 can transmit data that includes a name identifying a particular user profile to a server 314 configured to store user profile factors in a data store 316. The server 314 can transmit data that includes user profile factors back to the mobile computing device 102. The user profile factors can include any suitable information for determining gas station recommendations, including but not limited to brand preference, price sensitivity, time sensitivity, and third party rating sensitivity. Generally, the user profile factors reduce a large amount of information that is available about driver refueling habits into discrete factors suitable for computer decision making. The user profile factors can be updated. For example, each time the user stops and refuels the vehicle 302, the user profile factors can be compared against the gas station being used for refueling the vehicle 302 to determine if the user profile factors need to be updated. For example, a user may stop and refuel the vehicle 302 at a non-preferred gas station for any number of reasons, for example because the vehicle 302 is low on fuel, or because the price is attractive, or because the user has received promotions. By comparing the refueling at the non-preferred gas station with historical data obtained from previous refuelings, a trend can be identified and an appropriate change to the factor can be derived from the data about the refueling. For example, if the user continues to use non-preferred gas stations, then the user profile factors can be updated, if appropriate, so that the non-preferred gas stations can be presented as the preferred gas stations in future gas station recommendations. In a configuration, the user profile factors can be compared while the vehicle 302 is being driven. For example, based on gas stations that the user passes and does not use for refueling, especially when a fuel level is low, the mobile computing device 102 can profile the user's refueling habits and update the user profile factors accordingly. For example, if the fuel level of the vehicle 302 is low, and the user passes the preferred gas station and drives further to a non-preferred gas station, then this event can provide a strong inference that the user profile factors need to be updated. One or more of the user profile factors can be updated, if appropriate. The updated user profile factor can be derived, at least in part, from information associated with the non-preferred gas station, such as brand, price, location, and so forth. In another example, if the fuel level is not low, and the user stops at a non-preferred gas station that has particular amenities or particularly inexpensive gas, then the mobile computing device 102 can determine whether to update the user profile factors, or wait for additional refueling data so that a trend or change in refueling pattern can be properly detected. If the user profile factors are updated, the updated user profile factors for the particular user profile can be transmitted to a server 314 and stored in the data store 316. Example user profile factors are described in more detail below with regard to FIG. 4.

The mobile computing device 102 can accept a destination from the user, for example using interactive elements displayed on the touch sensitive screen. The mobile computing device 102 can include a GPS receiver, or can obtain position data from the vehicle data received from the vehicle network 306. The mobile computing device 102 can receive vehicle data, such as position, speed, and fuel level, as described above. The mobile computing device 102 can determine a route to the destination, as illustrated and described above for FIG. 1. The mobile computing device 102 can also use a third party 318 service, such as Google™ maps to determine the route. The mobile computing device 102 can display a map, as described above for FIG. 1.

The mobile computing device 102 can determine gas stations within range of the vehicle 302 or along the route. In a configuration, a remote server 314 or third party 328 can determine the gas stations within range or along the route. The range can be based on the available fuel in the vehicle 302. For example, if, based on the current fuel level received in the vehicle data, the vehicle 302 has sufficient fuel to travel only a limited distance, then only gas stations within that distance, or a configurable shorter distance, will be used. The range also can be based on a configurable distance from the projected route, or other suitable ranges. The mobile computing device 102 can also use a third party 318 service to determine gas stations within range.

The mobile computing device 102 compares the gas stations within range with the user profile factors such as brand preference, price sensitivity, time sensitivity, and third party rating sensitivity, for example. The mobile computing device 102 can obtain additional information about the gas stations within range, for example by querying third parties 318 such as Google™, YELP™, OPIS™, or other suitable third parties 318. In a configuration, the third party 318 provides crowd source type information. Crowd source information can include reviews, data, and ratings submitted by users and accumulated into rankings and other data by third parties 318. Example crowd source information can include the current price of different fuels offered by a particular service station.

The mobile computing device 102 can compare the user profile factors with information such as the destination, the route, the current vehicle position, and information about the gas stations within range to determine one or more gas station recommendations. In a configuration, the mobile computing device 102 only presents a single gas station recommendation to the user that is the closest match to the user profile factors. In a configuration, the mobile computing device 102 presents one or more gas station recommendations, for example in an order that is ranked, with the closest match being presented first.

Figure 4:
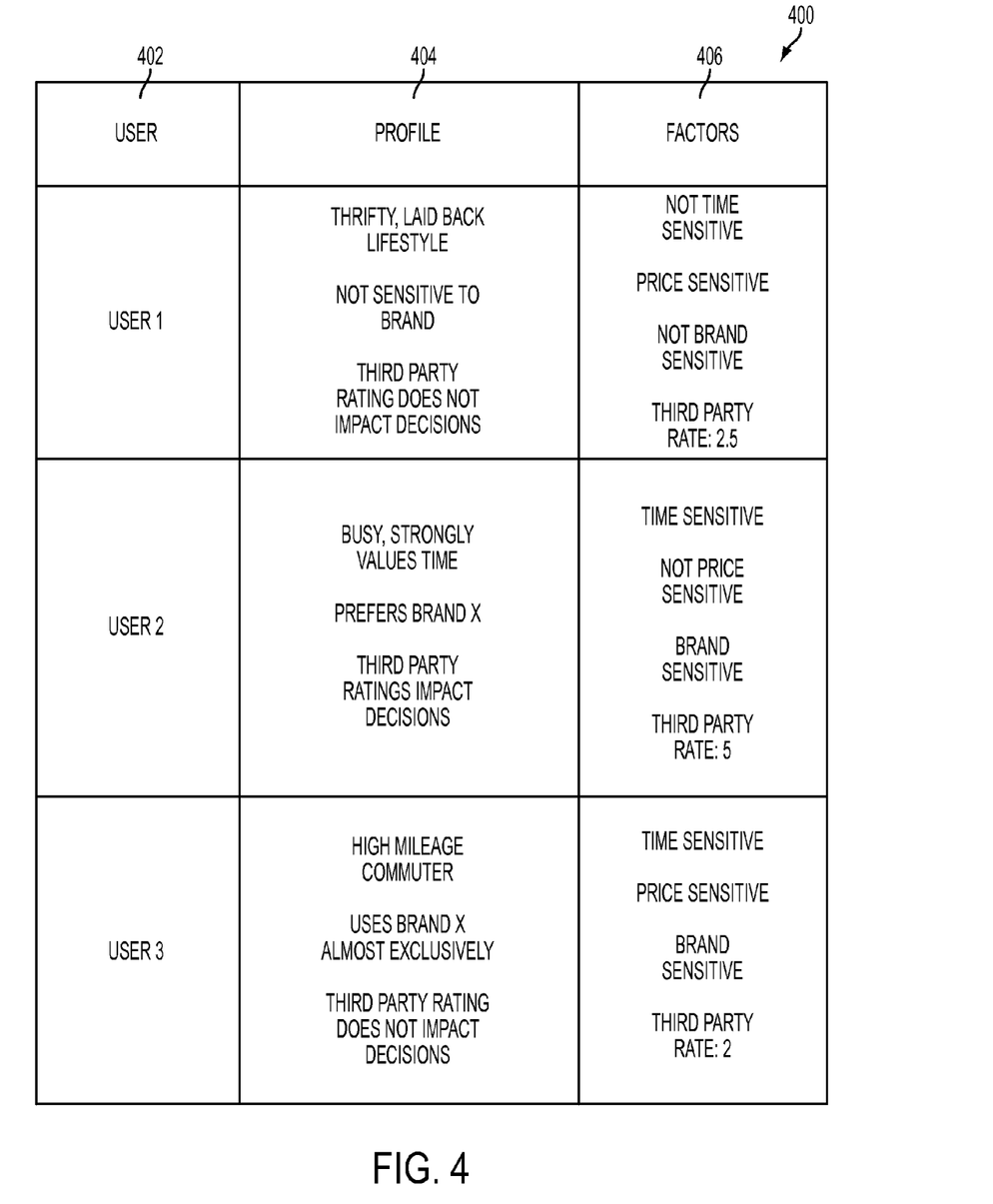
FIG. 4 depicts exemplary user profiles and user profile factors.

Referring now to FIG. 4, example records 400 that are stored in the data store 316 (FIG. 3) of the server 314 (FIG. 3) are presented. Example fields can include a user name 402 or profile name, a profile description 404, and user profile factors 406. Other fields, or fewer fields can use used. The user name 402 is a name associated with a particular user, driver, or device such as the mobile computing device or a GPS device. Generally, the user name 402 is a unique identifier. The profile description 404 can be a verbal description that generally describes typical refueling preferences of one or more users, and can be closely associated with a set of user profile factors 406. The profile description 404 can be provided to users to pre-configure or reconfigure their refueling preferences to the associated set of user profile factors 406.

User profile factors 406 can include time sensitivity, price sensitivity, brand sensitivity, and third party rating sensitivity. Other suitable profile factors 406 can also be used. The user profile factors 406 can be descriptive, for example using words that make the user profile factors 406 suitable for both people and machines, sometimes referred to as a man-machine language. For example, a user profile factor 406 associated with a user's price sensitivity to the price of gasoline offered by service stations can have a value of exactly either "not price sensitive" or "price sensitive", and therefore can be the equivalent of a binary 1 or 0. A user profile factor 406 associated with a user's desire to only use gas stations that received positive reviews on third party sites, can include a threshold review rating that must be exceeded, such as a number in the range of 1 through 10 that represents the rating given by reviewers on the third party site, sometime referred to as crowdsourcing. Various user profile factors 406 can also use, in addition to man-machine language or rating thresholds, scaled numbers (for example a number indicating a ranking between 0 and 9), binary numbers (0 or 1), or any other suitable number or character-based indicator, including but not limited to binary data, and data structures.

For example, User 1 has a profile description 404 for a thrifty person who prefers the least expensive fuel, and corresponding user profile factors 406 that indicate the user is sensitive to price, slightly sensitive to third party rankings, but not sensitive to time or brand. In a second example, User 2 has a profile description 404 for a busy individual who prefers to purchase fuel from quality stations that are nearby to the individuals route, and further could be a user who has a credit card for the particular gas station or uses a frequent user card that provides promotional discounts or other benefits. The corresponding user profile factors 406 indicate that the user is not price sensitive, but is sensitive to time, brand, and third party ratings. In a third example, User 3 has a profile description 404 for a high mileage commuter who spends a lot of time commuting, and therefore is both price sensitive and time sensitive, and who prefers certain brands of fuel, but is relatively indifferent to third party ratings.

The gas recommendation system and method profile a user's refueling habits, and determine a set of user profile factors 406 that approximate the user's refueling preferences. The user profile factors 406 simplify the data about the user's refueling preferences, allowing computer algorithms to determine one or more preferred gas station to present to the user that most closely match the particular user's user profile factors 406. The gas recommendation system and method can use any suitable algorithm for determining the preferred gas stations using the user profile factors 406. For example, the gas recommendation system and method can use weighting algorithms, that weight the various user profile factors 406 in determining the closest match, algorithms that use thresholds, learning algorithms, and other suitable computer algorithms as would be understood in the art.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, using, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Figure 5:
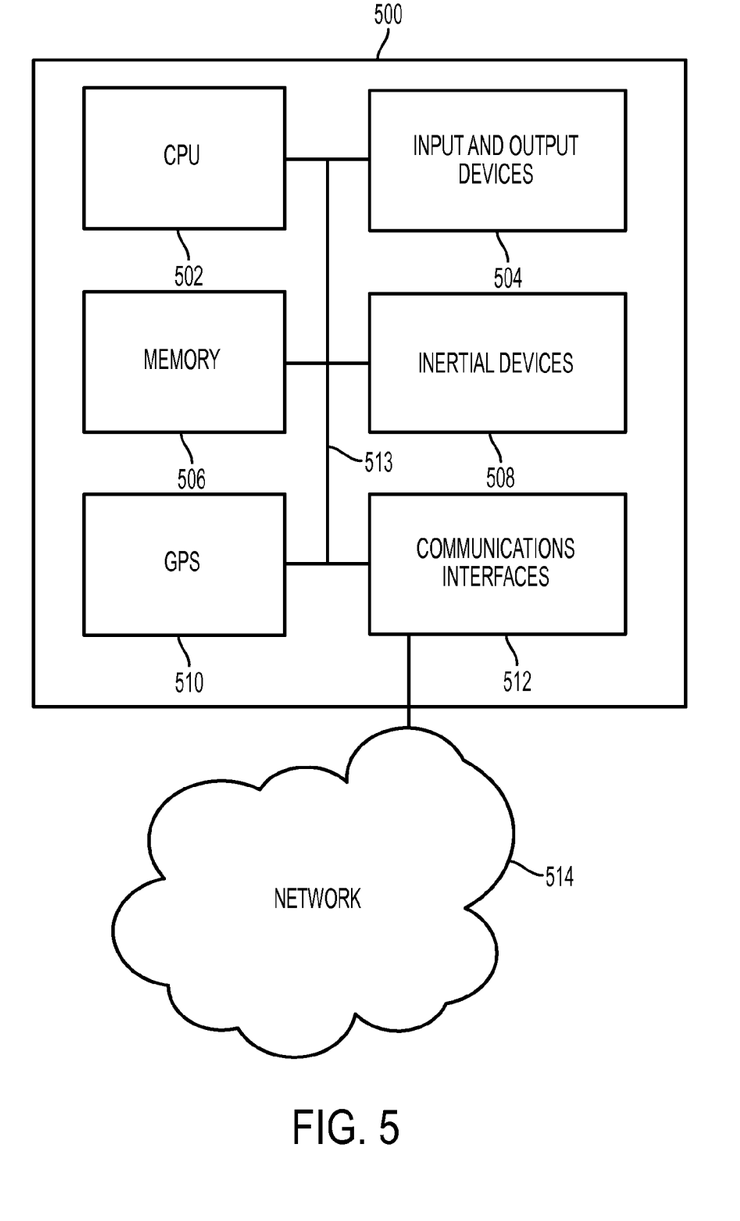
FIG. 5 depicts an exemplary hardware platform.

The processes described herein can be executed by programmable equipment, such as computers or computer systems and/or processors. Software that can cause programmable equipment to execute processes can be stored in any storage device. Referring now to FIG. 5, example elements of an exemplary computing device 500 are illustrated. The computing device can be the mobile computing device, a computing device that is integrated with or incorporated into a vehicle system or subsystem, including vehicle electronics, a server, and a mobile computing device. The computing device 500 can be any suitable computing device as would be understood in the art, including without limitation, a custom chip, an embedded processing device, a tablet computing device, a personal data assistant (PDA), a wireless e-mail device, an e-ink reading device, a cellular phone, a pager, fax machine, a scanner, a desktop, a laptop, a microcomputer, a minicomputer, a server, a mainframe, or any other suitable programmable device. In various embodiments disclosed herein, a single component can be replaced by multiple components and multiple components can be replaced by a single component to perform a given function or functions. Except where such substitution would not be operative, such substitution is within the intended scope of the embodiments.

The computing device 500 includes a processor 502 that can be any suitable type of processing unit, for example a general purpose central processing unit (CPU), a reduced instruction set computer (RISC), a processor that has a pipeline or multiple processing capability including having multiple cores, a complex instruction set computer (CISC), a digital signal processor (DSP), an application specific integrated circuits (ASIC), a programmable logic devices (PLD), and a field programmable gate array (FPGA), among others. The computing resources can also include distributed computing devices, cloud computing resources, and virtual computing resources in general.

The computing device 500 also includes one or more memories 506, for example read only memory (ROM), random access memory (RAM), cache memory associated with the processor 502, or other memories such as dynamic RAM (DRAM), static ram (SRAM), programmable ROM (PROM), electrically erasable PROM (EEPROM), flash memory, a removable memory card or disk, a solid state drive, and so forth. The computing device 500 also includes storage media such as a storage device that can be configured to have multiple modules, such as magnetic disk drives, floppy drives, tape drives, hard drives, optical drives and media, magneto-optical drives and media, compact disk drives, Compact Disk Read Only Memory (CD-ROM), Compact Disk Recordable (CD-R), Compact Disk Rewriteable (CD-RW), a suitable type of Digital Versatile Disk (DVD) or BluRay disk, and so forth. Storage media such as flash drives, solid state hard drives, redundant array of individual disks (RAID), virtual drives, networked drives and other memory means including storage media on the processor 502, or memories 506 are also contemplated as storage devices. It can be appreciated that such memory can be internal or external with respect to operation of the disclosed embodiments. It can be appreciated that certain portions of the processes described herein can be performed using instructions stored on a computer-readable medium or media that direct a computer system to perform the process steps. Non-transitory computer-readable media, as used herein, comprises all computer-readable media except for transitory, propagating signals.

Network and communication interfaces 512 can be configured to transmit to, or receive data from, other devices across a network 514. The network and communication interfaces 512 can be an Ethernet interface, a radio interface, a Universal Serial Bus (USB) interface, or any other suitable communications interface and can include receivers, transmitter, and transceivers. For purposes of clarity, a transceiver can be referred to as a receiver or a transmitter when referring to only the input or only the output functionality of the transceiver. Example communication interfaces 512 can include wired data transmission links such as Ethernet and TCP/IP. The communication interfaces 512 can include wireless protocols for interfacing with private or public networks 514. For example, the network and communication interfaces 512 and protocols can include interfaces for communicating with private wireless networks such as a WiFi network, one of the IEEE 802.11x family of networks, or another suitable wireless network. The network and communication interfaces 512 can include interfaces and protocols for communicating with public wireless networks 512, using for example wireless protocols used by cellular network providers, including Code Division Multiple Access (CDMA) and Global System for Mobile Communications (GSM). A computing device 500 can use network and communication interfaces 512 to communicate with hardware modules such as a database or data store, or one or more servers or other networked computing resources. Data can be encrypted or protected from unauthorized access.

In various configurations, the computing device 500 can include a system bus 513 for interconnecting the various components of the computing device 500, or the computing device 500 can be integrated into one or more chips such as programmable logic device or application specific integrated circuit (ASIC). The system bus 513 can include a memory controller, a local bus, or a peripheral bus for supporting input and output devices 504, inertial devices 508, GPS and inertial devices 510, and communication interfaces 512. Example input and output devices 504 include keyboards, keypads, gesture or graphical input devices, motion input devices, touchscreen interfaces, one or more displays, audio units, voice recognition units, vibratory devices, computer mice, and any other suitable user interface. An example GPS device 510 can include a GPS receiver and associated circuitry. Inertial devices 508 can include accelerometers and associated circuitry. The associated circuitry can include additional processors 502 and memories 506 as appropriate.

The processor 502 and memory 506 can include nonvolatile memory for storing computer-readable instructions, data, data structures, program modules, code, microcode, and other software components for storing the computer-readable instructions in non-transitory computer-readable mediums in connection with the other hardware components for carrying out the methodologies described herein. Software components can include source code, compiled code, interpreted code, executable code, static code, dynamic code, encrypted code, or any other suitable type of code or computer instructions implemented using any suitable high-level, low-level, object-oriented, visual, compiled, or interpreted programming language.

Figure 6:
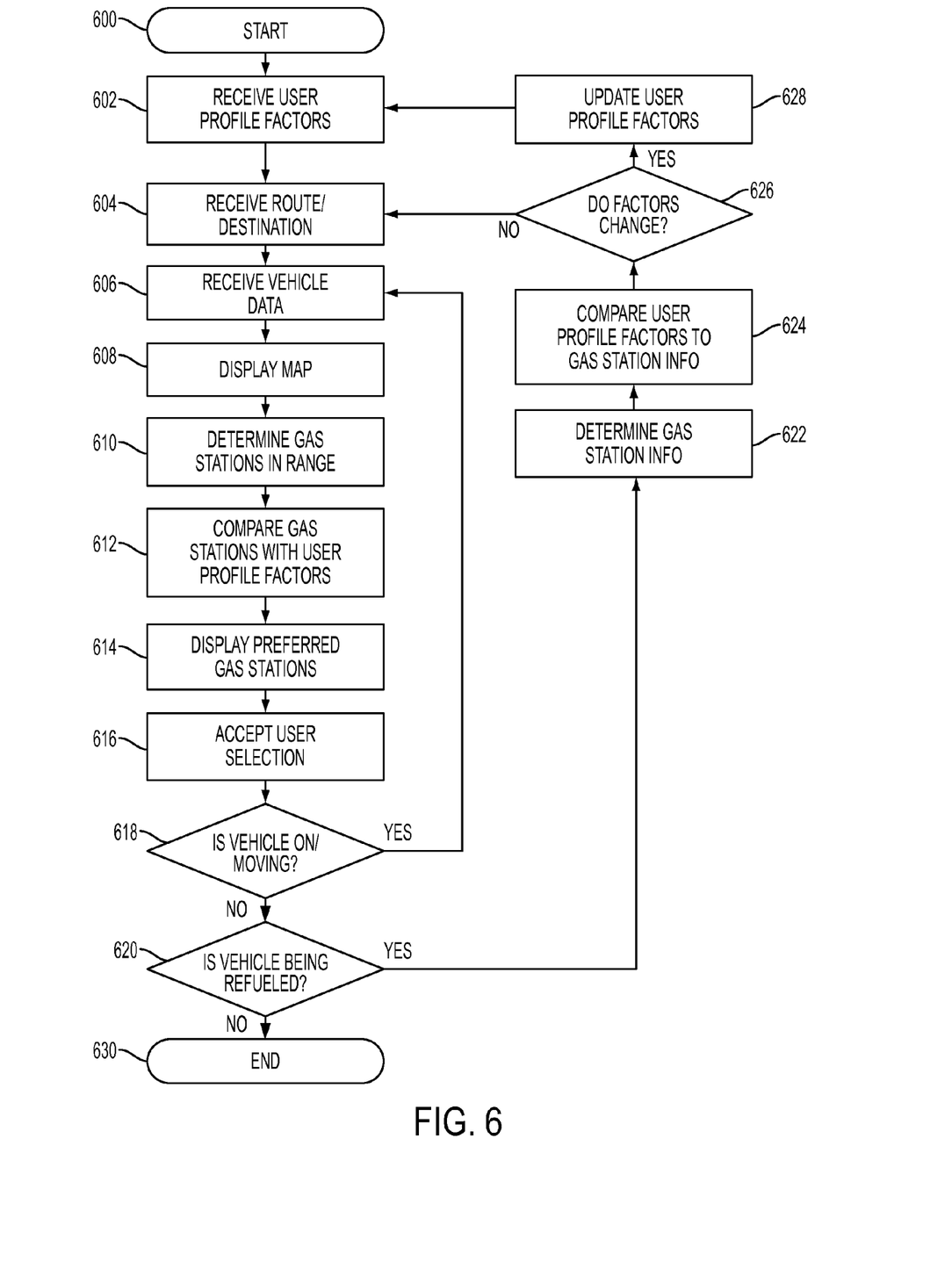
FIG. 6 depicts an example process flow that uses user profile factors to provide gas station recommendations.

Referring now to FIG. 6, an exemplary flowchart of the operation of a process for determining gas station recommendations, based at least in part on user profile factors, is presented. Operation starts with start block 600 labeled START, where a process for determining gas stations recommendations begins executing. Processing continues to process block 602.

In process block 602, one or more systems receive user profile factors. The systems can include the mobile computing device, the server, or the third party, as appropriate. The system can receive user profile factors based on a user profile. The user profile can be manually entered into a GPS device or the mobile computing device by the user. The user profile can also be selected by user or driver from a list of users. The user profile can also be automatically determined. For example, if the mobile computing device is a smart phone associated with a particular user, then the system can use the user profile associated with that particular user. In another example, if a driver uses a key or keyfob to unlock a door or start the vehicle, vehicle electronics in communication with the GPS device or mobile computing device can receive the driver's identify and use it for the user profile. As describe above for FIG. 4, the user profile can have user profile factors associated with a particular user. Processing continues to process block 604.

In process block 604, one or more systems receive information associated with the route or destination that the vehicle intends to travel. For example, route or destination can be entered by the user into the GPS or mobile computing device, selected from a list of destinations, or determined from previous trips. The route or destination information can be transmitted between systems. Processing continues to process block 606.

In process block 606, one or more systems receive vehicle data. Vehicle data can include the current position, the start position of the vehicle when the route or destination was selected, the speed of the vehicle, the fuel level, blinker or turn signal activation, information from environmental sensors, or vehicle sensors. In a configuration, the mobile computing device receives position, speed, and fuel level data from the vehicle controller area network (CAN), for example over a wireless connection to a transceiver connected to the CAN. Processing continues to process block 608.

In process block 608, a map is displayed on the GPS or mobile computing device, for example the map as shown in FIG. 1. The map can include the start position of the vehicle, the destination, the projected route, and roads. Processing continues to process block 610.

In process block 610, one or more systems determine gas stations in range of the vehicle. The range can be based on the area that is displayed on the map. The range can be based on the available fuel in the vehicle. For example, if based on the current fuel level, the vehicle has enough fuel to travel only a limited distance, then only gas stations within that distance, or a configurable shorter distance, will be used. The range can be based on a configurable distance from the projected route. Other suitable ranges can also be used. Processing continues to process block 612.

In process block 612, one or more systems compare the information about the gas stations that are within the range determined above, with the user profile factors associated with the user profile. The systems can use the user profile factors together with information about the destination, the route, and the vehicle position to determine one or more preferred gas stations from the gas stations that are within range. For example, if the user has a profile similar to the user profile 3 described for FIG. 4 above, the system can use that user's profile factors to select a gas station, from the gas stations within range, that sells the user's preferred brand of fuel, but that also has the lowest price and is nearest to the user's projected route. In a configuration, the system determines a single preferred gas station to recommend to the user. In a configuration, the system determines more than one preferred gas station to recommend to the user. The system can rank the preferred gas stations based on any suitable factor or other information, including but not limited to whether the user would have to turn the vehicle around and backtrack, leave the current route in order to travel to the preferred gas station, cross traffic to get to the service station, and so forth. Processing continues to process block 614.

In process block 614, the GPS or mobile computing device receives one or more preferred gas stations and presents the preferred gas station to the user. For example, as illustrated in FIG. 1, the user can be presented with a display of preferred gas stations that are presented both in terms of location on the map, and a selectable list. The list can be displayed with preferred gas stations ranked in order of how closely they matched the user profile factors. If more than one preferred gas station is presented, the preferred gas stations can be color coded, blinking, or otherwise visually identified to the user in a manner than alerts the user as to the ranking of the preferred gas stations. Processing continues to process block 616.

In process block 616, the user can optionally select a preferred gas station. In a configuration, the more than one preferred gas station can be presented to the user. The GPS or mobile computing device can accept a user selection of the preferred gas station and the position of the preferred gas station can be added to the route, or can be the destination on the map, as is appropriate. Processing continues to decision block 618.

In decision block 618, if the vehicle is on or is moving, then processing continues back to process block 606, otherwise processing continues to decision block 620.

In decision block 620, if the vehicle is being refueled, then processing continues to process block 622. In a configuration, whether the vehicle is being refueled can be determined from vehicle information, for example from the fuel level received from by the mobile computing device from the vehicle sensors. For example, the fuel level can be received by the mobile computing device from data transmitted across the vehicle controller area network (CAN). Details regarding the particular gas station used for refueling can also be stored by the system, such as brand, price, and so forth. If after a configurable amount of time, the mobile computing device determines that the vehicle is off and not moving, and the vehicle is not being refueled, for example if the vehicle is parked and turned off, then processing terminates at end block 618 labeled END.

In process block 622, the position of the vehicle can be used by one or more systems to determine information about the gas station that the user selected for refueling the vehicle. The position can be determined by the GPS device, received from the vehicle data, or determined based on the user reaching the selected preferred gas station or destination. The gas station information can be determined information stored by the server in the data store. The gas station information can be determined from information available through third party services. Gas station information can include the location, the brand of fuel associated with the service station, the price for different fuels, based for example on octane ratings, amenities available at the service station, and third party ratings. Processing continues to process block 624.

In process block 624, the user profile factors are compared to the gas station information. The gas station information can be recorded, for example by creating a data record in the data store that is associated with the user profile. Processing continues to decision block 626.

In decision block 626, if the gas station information does not match the user profile factors, then the system can determine whether to update the user profile factors. The system can use the data records stored in the data store. For example, if data records in the data store associated with the user profile indicate that the user's refueling preferences have changed, then the system can update the user profile factors. For example, if example user 2 of FIG. 4 described above began to frequent the least expensive gas stations, or gas stations that offered a brand different than his previously preferred brand of fuel, then the system could use this new information to update the user's associated user profile factors to indicate that the user was price sensitive or brand insensitive, as appropriate. The system can use any suitable algorithm for updating the user profile factors, including weighted algorithms, windowing algorithms, algorithms having thresholds, and so forth. In a configuration, the system can continuously monitor the user's driving habits to determine if a user profile factor can be updated. For example, while the vehicle is moving, the system can monitor the gas stations along the route that the user passes, but does not purchase gas from, and use that information to determine if the use profile factors can be updated. If the user profile factors have changed, then processing continues to process block 628, otherwise processing continues to process block 604 where a user, after refueling the vehicle, can enter a new route or destination or continue to the originally selected destination.

In process block 628, the system updates the user profile factors to better correlate with the user's refueling habits, as captured in the data records. The system transmits the updated user profile factors to other systems. Processing continues to process block 602, where the updated user profile factors are received by one or more systems.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A computer-implemented method, using one or more processors, comprising:
    determining, by one or more processors, a plurality of gas stations in range of a vehicle;
    receiving, by the one or more processors, a derived factor associated with a refueling preference for a profile associated with the vehicle, the derived factor derived at least in part from data associated with a plurality of previous refuelings of the vehicle and identifying a refueling trend for the profile, wherein the derived factor is any of a brand preference factor, a price sensitivity factor, a time sensitivity factor, and a third party rating sensitivity factor;
    comparing, by the one or more processors, the derived factor with information associated with the plurality of gas stations;
    determining, by the one or more processors, a preferred gas station based at least in part on the result of the comparing operation;
    determining, by the one or more processors, that the vehicle has been refueled at a non-preferred gas station different from the preferred gas station;
    comparing, by the one or more processors, information associated with the non-preferred gas station with the derived factor; and
    updating, by the one or more processors, the derived factor based at least in part on the information associated with the non-preferred gas station.

2. The method of claim 1, further comprising:
displaying an indication of the preferred gas station.

3. The method of claim 1, further comprising:
receiving a destination as an input; and
determining a route to the destination;
wherein the plurality of gas stations are within a threshold distance of the route.

4. The method of claim 1, further comprising:
determining a range of the vehicle based at least in part on fuel data received from vehicle electronics associated with the vehicle.

5. The method of claim 1, further comprising:
determining that the vehicle has been refueled at a non-preferred gas station different from the preferred gas station;
comparing information associated with the non-preferred gas station with the derived factor; and
determining whether to update the derived factor based at least in part on the information associated with the non-preferred gas station.

6. The method of claim 5, further comprising:
updating the derived factor based at least in part on the information associated with the non-preferred gas station.

7. The method of claim 5, wherein the determining that the vehicle has been refueled is based at least in part on fuel data received from vehicle electronics associated with the vehicle.

8. The method of claim 1, wherein the derived factor is received from a source, and wherein the information associated with the plurality of gas stations is received from a third party that is different from the source of the derived factor.

9. The method of claim 1, further comprising:
    determining, by the one or more processors, that the vehicle has been driven past the preferred gas station and refueled at a non-preferred gas station;
    comparing, by the one or more processors, information associated with the non-preferred gas station with the derived factor; and
    determining, by the one or more processors, whether to update the derived factor based at least in part on the information associated with the non-preferred gas station.

10. A mobile computing device, comprising:
    a receiver configured to enable communications with a remote server, and further configured to receive a derived factor associated with a refueling preference for a profile from the remote server, the derived factor identifying a refueling trend for the profile and derived at least in part from data associated with a plurality of previous refuelings of a vehicle; and
    a processor configured to:
        determine a plurality of gas stations in range of the vehicle;
        compare the derived factor with information associated with the plurality of gas stations;

determine a preferred gas station based at least in part on the result of the compare operation;

determine that the vehicle has been refueled at a non-preferred gas station different from the preferred gas station;

compare information associated with the non-preferred gas station with the derived factor; and update the derived factor based at least in part on the information associated with the non-preferred gas station.

11. The mobile computing device of claim 10, further comprising:

a display configured to display interactive elements for accepting a user input and configured to display the preferred gas station.

12. The mobile computing device of claim 11, wherein:

when the display receives a destination as the user input, the processor is further configured to determine a route to the destination; and the plurality of gas stations are within a threshold distance of the route.

13. The mobile computing device of claim 10, wherein:

the receiver is further configured to enable communications with a vehicle controller area network; and the processor is further configured to determine a range of the vehicle based at least in part on fuel data received, using communications through the vehicle controller area network, from vehicle electronics associated with the vehicle.

14. The mobile computing device of claim 10, wherein the receiver is further configured to receive a plurality of derived factors, wherein each of the plurality of derived factors is selected from the group consisting of a price sensitivity factor, a time sensitivity factor, a brand sensitivity factor, and a third party rating factor.

15. The mobile computing device of claim 10, wherein:

the receiver is further configured to enable communications with a vehicle controller area network; and wherein the processor is further configured to determine that the vehicle has been refueled based at least in part on fuel data received, using communications through the vehicle controller area network, from vehicle electronics associated with the vehicle.

16. The mobile computing device of claim 10, wherein the receiver is further configured to enable communications with a third party, different from the remote server, for receiving the information associated with the plurality of gas stations.

17. The mobile computing device of claim 10, wherein the derived factor identifying is derived at least in part from fuel level data associated with a plurality of previous refuelings of a vehicle.

18. The mobile computing device of claim 17, wherein the processor is further configured to:

determine that the vehicle is refueled at the non-preferred gas station when the fuel level data indicates a high fuel level; and determine that the vehicle is driven past a preferred gas station when the fuel level data indicates a low fuel level.

19. A method, comprising:

determining, by a mobile computing device, one or more refueling habits of a user of a vehicle, wherein at least one of the one or more refueling habits is based at least in part on information associated with a gas station that was previously used to refuel the vehicle, and wherein the one or more refueling habits comprises any of a brand preference, a price sensitivity, a time sensitivity, and a third party rating sensitivity;

determining, by the mobile computing device, a preferred gas station from a plurality of gas stations proximate to at least one of:

a current position of the vehicle; and a projected route of the vehicle; and wherein the preferred gas station is based at least in part on the at least one or more refueling habits of the user of the vehicle;

determining, by the mobile computing device, that the vehicle has been refueled at a non-preferred gas station different from the preferred gas station;

comparing, by the mobile computing device, information associated with the non-preferred gas station with the one or more refueling habits; and updating, by the mobile computing device, the one or more refueling habits based at least in part on the information associated with the non-preferred gas station.

20. The method of claim 19, further comprising:

updating at least one of the one or more refueling habits when a gas station used to refuel the vehicle is not the preferred gas station.

* * * * *